United States Patent [19]
Groff et al.

[11] 3,993,356
[45] Nov. 23, 1976

[54] TRACK CARRYING WHEELS FOR CRAWLER TYPE VEHICLES HAVING IMPROVED PANEL ASSEMBLIES

[75] Inventors: Eugene R. Groff, Chillicothe; Paul L. Wright, Peoria, both of Ill.

[73] Assignee: Caterpillar Tractor Co., Peoria, Ill.

[22] Filed: Oct. 14, 1975

[21] Appl. No.: 622,205

[52] U.S. Cl. ............................ 301/6 WB; 74/230.3; 74/443; 301/63 DD; 305/21
[51] Int. Cl.² ........................................ B60B 19/00
[58] Field of Search .................. 305/21, 28, 25, 24; 301/63 DD, 63 PW, 63 DS, 6 WB, 37 S, 37 P; 74/230.8, 230.01, 230.05, 230.1, 230.3, 443; 29/159 R, 159.01

[56] References Cited
UNITED STATES PATENTS

| | | | |
|---|---|---|---|
| 2,320,163 | 5/1943 | Anderson | 301/63 DD X |
| 3,307,419 | 3/1967 | Brickett et al. | 74/443 |

*Primary Examiner*—Robert B. Reeves
*Assistant Examiner*—John P. Shannon
*Attorney, Agent, or Firm*—Frank L. Hart

[57] ABSTRACT

A wheel for carrying continuous track of crawler type vehicles has a set of spaced pairs of inner and outer panel members that are connected together through vibration barriers. One of the inner or outer panels is formed of a laminate.

8 Claims, 4 Drawing Figures

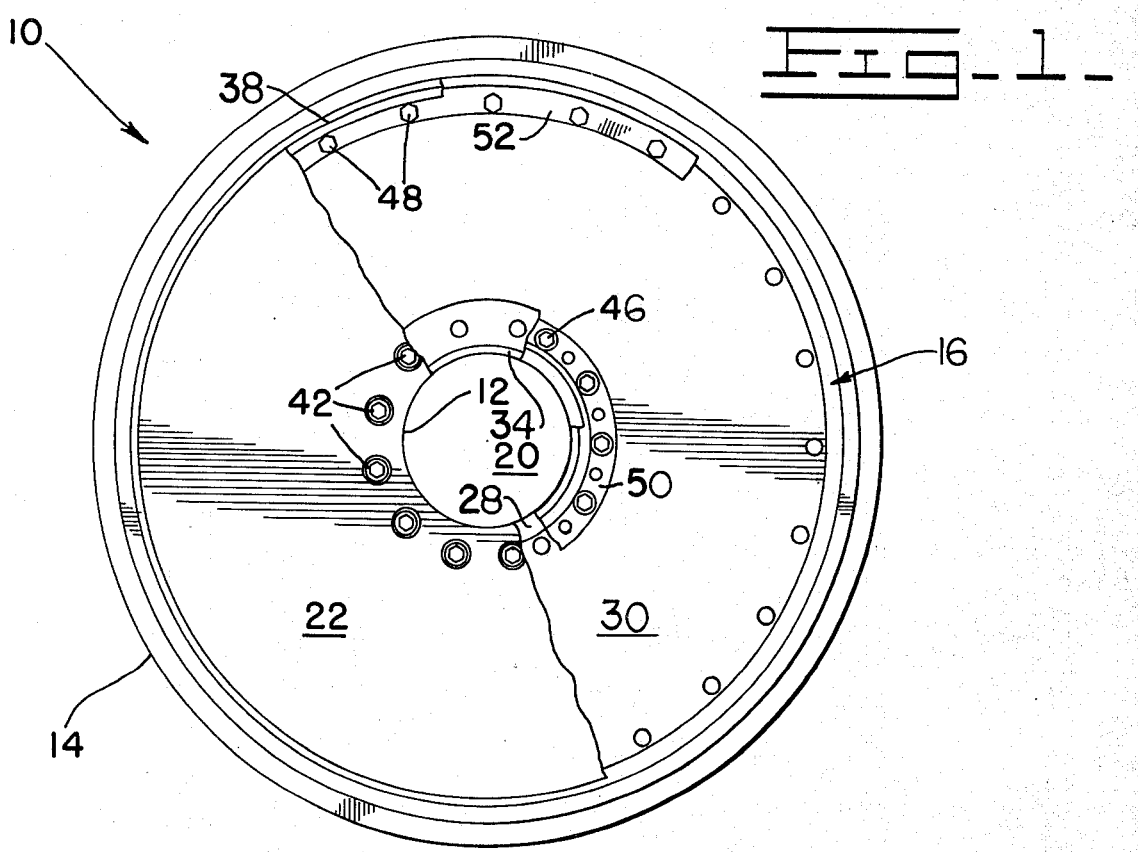
Fig-1-
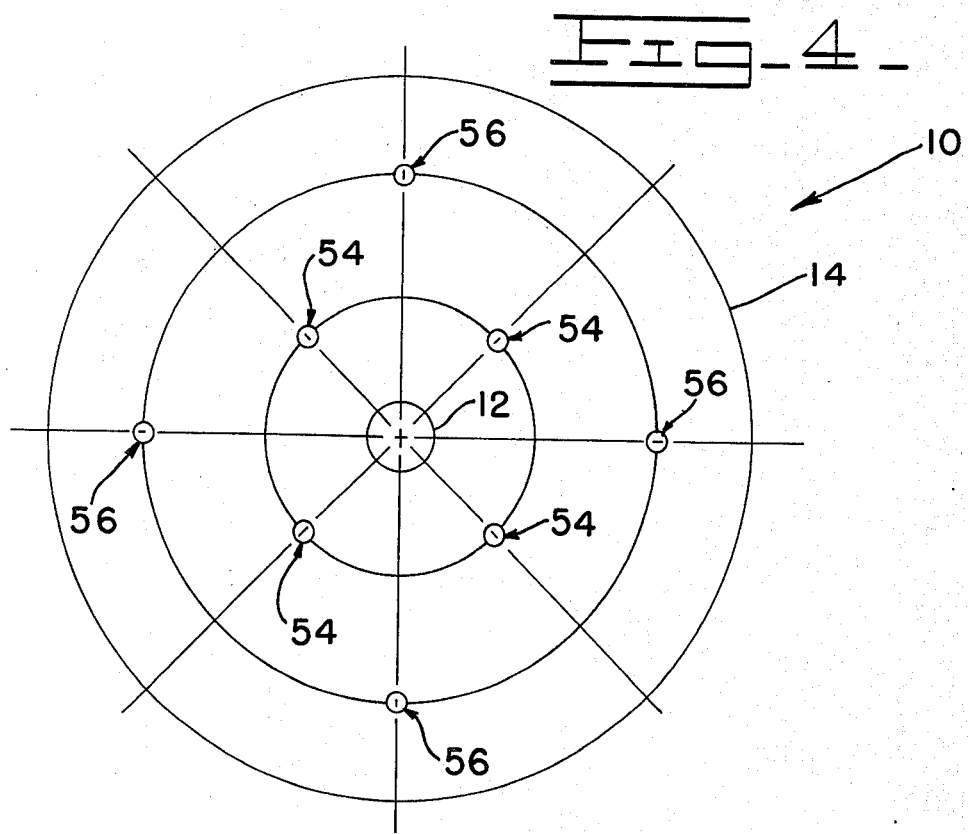
Fig-4-

TRACK CARRYING WHEELS FOR CRAWLER TYPE VEHICLES HAVING IMPROVED PANEL ASSEMBLIES

BACKGROUND OF THE INVENTION

Crawler tractors are provided with power driven chains on either side of the tractor frame, made up of a plurality of pivotally linked shoes suspended over a rear drive sprocket and supported at the front portion of the tractor over idler wheels. The weight of the machine is carried on the lower run of the chains as they pass under rollers carried by pivoted side frames. The idler wheels are therefore subject to a wide variety of impacts and forces which cause the wheel to deflect, vibrate, and emit undesirable noise.

Since work vehicles of this type are often used in highly populated areas, it is desirable to provide idler or other wheels which do not produce disturbing noises.

This invention therefore resides in a unique construction of a wheel which has elements which function to suppress vibrations of the wheel.

BRIEF DESCRIPTION OF THE DRAWINGS

FIG. 1 is a diagrammatic frontal view of a wheel of this invention;

FIG. 4 is a diagrammatic frontal view of the embodiment of FIG. 3.

DETAILED DESCRIPTION OF THE INVENTION

Figure 2:
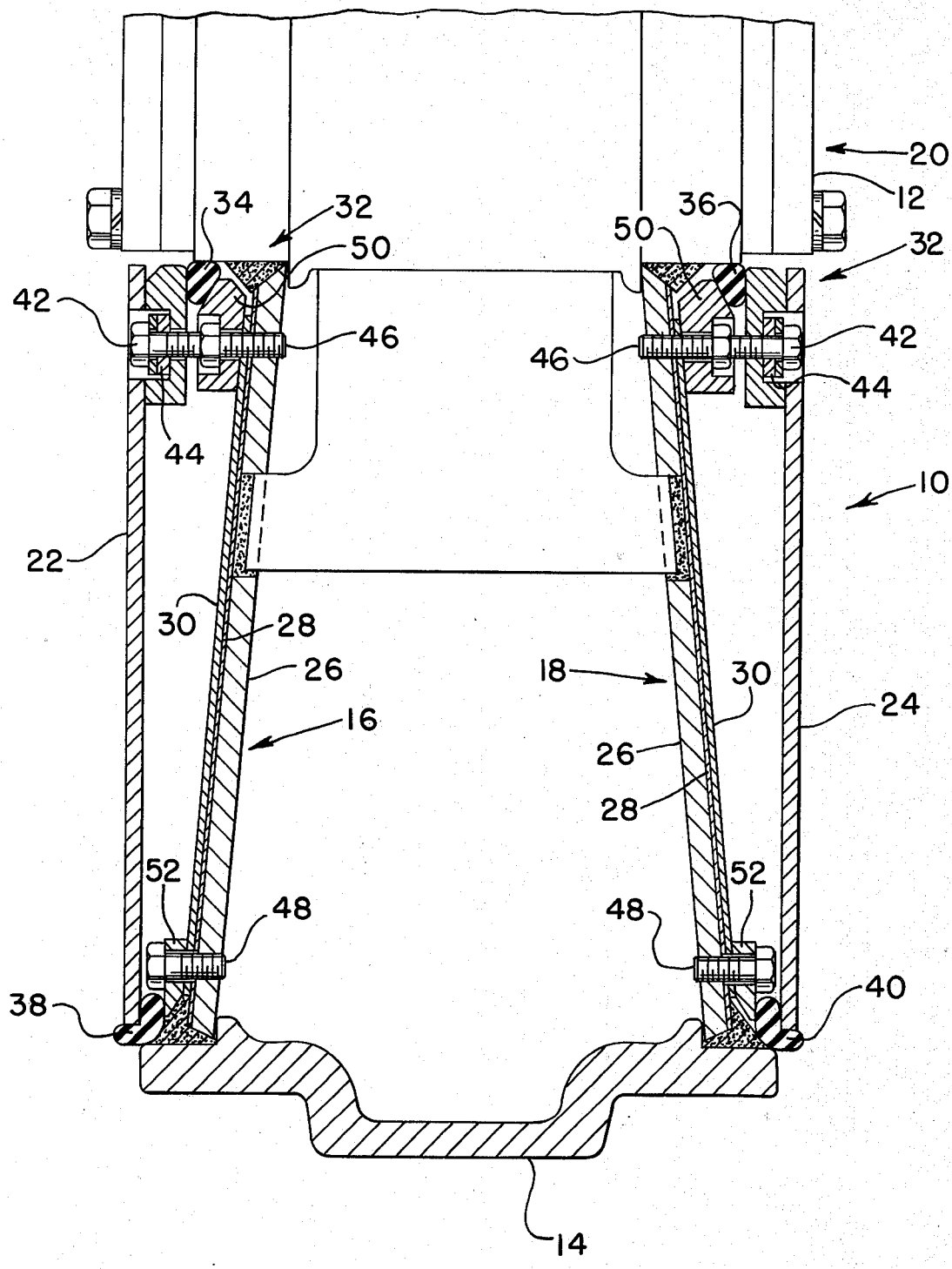
FIG. 2 is a diagrammatic end view in section of a portion of the wheel of FIG. 1.

Referring to FIGS. 1 and 2, a wheel 10, particularly a wheel for carrying a continuous track of a crawler type vehicle, has a hub member 12 and an annular rim 14. The hub 12 and rim 14 are connected one to the other by first and second spaced inner panels 16,18.

Each of the first and second inner panels 16,18 have a central opening 20 and an outer periphery. The panels 16,18 are connected about their central opening to the hub 12 and about their outer periphery to the annular rim 14. These connections are preferably made by welding but can be by any means known in the art which includes casting as a unitary structure.

First and second outer panels 22,24 are each connected to a respective inner panel 16,18. Each of the outer panels 22,24 have a central opening 20 and an outer periphery and are spaced from the respective inner panels 16,18.

One of said pair of inner panels 16,18 or said pair of outer panels 22,24 is a laminate formed of first and second different materials 26,28. Preferably, the laminate is formed of first, second, and third materials 26,28,30.

Means 32 is provided for releasably connecting the outer panels 22,24 to the inner panels and providing a vibration barrier between the panels at the connection. Preferably, in the embodiment of FIGS. 1 and 2, the outer panels 22,24 are connected to the inner panels 16,18 at spaced apart locations about and adjacent only the central opening 20. In this embodiment, a pair of first vibration suppressing elements 34,36 are each positioned between respective inner and outer panels 16,22 and 18,24 adjacent the central opening 20. A pair of second vibration suppressing elements 38,40 are each positioned between respective inner and outer panels 16,22 and 18,24 adjacent the rim 14. Preferably, the vibration suppressing elements 34,36,38,40 are each of an annular configuration in order to maintain construction of the wheel simple and to more completely suppress the transmission of vibration between elements. Bolts 42 or other fastening means preferably having resilient washers 44 connect the outer panels 16,18 about the hub 12.

In the preferred construction of the embodiment of FIGS. 1 and 2, the inner panels are laminates, each formed of a first material 26, steel for example, a second material 28, viscoelastic material for example, and a third material 30 to protect the viscoelastic material 28 from damage, the viscoelastic material 28 substantially completely covers a first surface of the first material 28 of the laminate and the third material 30 sandwiches the second material 28 between the first and third materials 26,30 and substantially completely covers said second material 28.

By the term viscoelastic material as used herein, it is meant material that is capable of being bonded to steel and which has the properties of being viscous and elastic and of the type identified as Dow-Corning DC 271, which is a silicone base material manufactured by the Dow-Corning Corporation of Saginaw Rd., Midland, Mich. 48640.

The materials 26,28,30 of the laminate are maintained relative one to the other by welding the first material 26 to the hub 12 and rim 14 as set forth above, and providing a first plurality of fastening means 46 positioned about the central opening 20 of the laminate and a second plurality of fastening means 48 positioned about the outer periphery of the laminate for forming composite inner panels 16,18. The fastening means 46,48 preferably extend through respective first and second annular holding elements 50,52.

For clarity, bolts 42 on the left side of FIG. 2 have been broken. As shown in FIG. 1, these bolts 42 extend through the first material 26 of the laminate and are arcuately spaced from the first fastening means 46.

Figure 3:
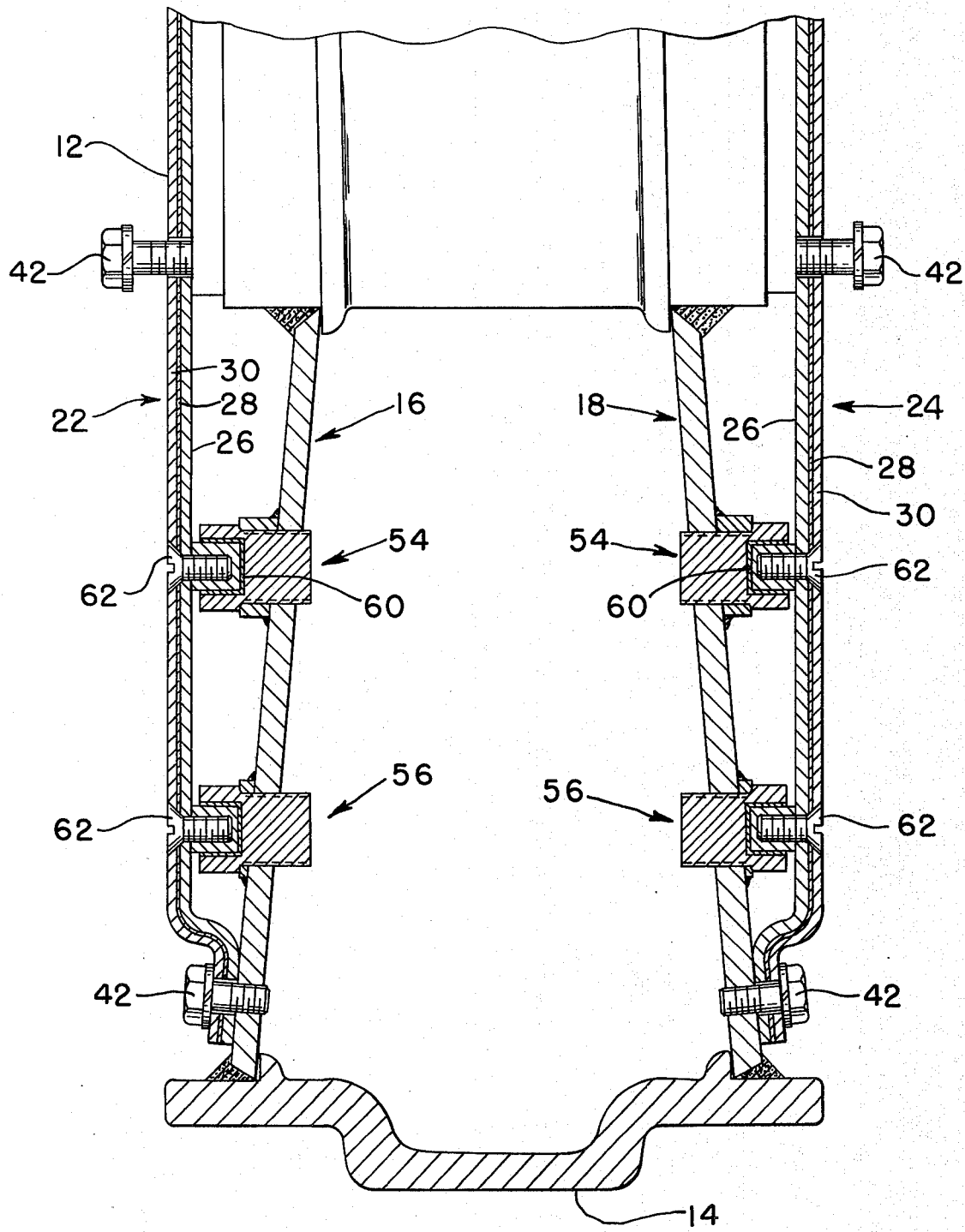
FIG. 3 is a diagrammatic end view in section of a portion of another embodiment of the wheel.

Referring to FIG. 3, the outer panels 22,24 are composite laminates. In this embodiment, each outer panel 22,24 is connected to the respective inner panel 16,18 at spaced apart locations along only an annular middle portion of the panels and along an outer edge portion of the panels 22,24 adjacent the rim 14 with the outer panels 22,24 connected about their central opening 30 directly to the hub 12. The outer edge portions of the respective panels 16,22 and 18,24 are connected together and the outer panels 22,24 are connected to the hub by bolts 42. However, it should be noted that the means 54,56 connecting the middle portion of the outer panels 22,24 to the middle portion of the inner panels 16,18 comprises a fastening member 62, such as a threaded member passing through the outer panels 22,24 and having viscoelastic material 60 positioned between the fastening members 62 and the inner panels 16,18.

These means 54,56 provide a vibration damped connection between the respective panel pairs 16,22 and 18,24. It should be understood, however, that the means 54,56 can be of other construction than shown without departing from this invention so long as the viscoelastic material is positioned between the connecting element and the respective inner panel 16,18. Further, in this embodiment the laminate is preferably formed of the first, second, and third materials 26,28, 30 as set forth above. The third material 30 utilized depends upon its location relative to the outer surface of the wheel 10. After the location has been determined, one can easily select a material which will withstand the impacts expected to be subjected upon and function to protect the viscoelastic second material 28. One example would be a third material 30 formed of steel for the embodiment of FIG. 3 and of organic plastic for the embodiment of FIG. 2.

FIG. 4 shows the relative placement of the connecting means 54,56. Preferably, these means 54,56 are positioned equally arcuate distances one from the other.

By so constructing the wheel of this invention, vibrations from impact forces subjected upon the outer surface of the wheel are suppressed and vibrations are restrained against passing from one plate to another which results in undesirable noise.

Other aspects, objects, and advantages of this invention can be obtained from a study of the drawings, the disclosure, and appended claims.

We claim:

1. A wheel for carrying continuous track of a crawler type vehicle, comprising:
    a hub member;
    a rim;
    first and second spaced inner panels connecting the hub to the rim;
    first and second outer panels each spaced from a respective inner panel, one of said pair of inner panels and said pair of outer panels being a laminate formed of at least first and second different materials;
    means for connecting the outer panels to the inner panels at locations immediately adjacent only the hub;
    a pair of first vibration damping elements, each element being positioned between respective inner and outer panels adjacent the hub; and
    a pair of second vibration damping elements, each element being positioned between respective inner and outer panels adjacent the rim.

2. Apparatus, as set forth in claim 1, wherein the first material of the laminate is steel and the second material is a viscoelastic material substantially covering first surfaces of the panels.

3. Apparatus, as set forth in claim 1, including a third material forming the laminate and wherein the first material of the laminate is steel, the second material is a viscoelastic material substantially covering first surfaces of the panels, and the third material substantially covers the viscoelastic material.

4. Apparatus, as set forth in claim 3, including means for maintaining the materials of the laminate fixed one to the others.

5. Apparatus, as set forth in claim 1, wherein the means connecting the outer panels to the inner panels each comprises a threaded fastening member and viscoelastic material positioned between the threaded fastening member and the inner panels.

6. A wheel for carrying continuous track of a crawler type vehicle, comprising:
    a hub member;
    a rim;
    first and second spaced inner panels connecting the hub to the rim;
    first and second outer panels each spaced outwardly from a respective inner panel and being of a laminate formed of at least first and second different materials;
    means for connecting the outer panels to the hub;
    means for connecting the outer panels to the inner panels at locations immediately adjacent the rim; and
    connecting means for damping vibrations and connecting middle portions of the outer panels to middle portions of respective inner panels, said vibration damping connecting means forming a viscoelastic barrier between respective inner and outer panels.

7. Apparatus, as set forth in claim 6, wherein said connecting means comprises:
    a female member having an opening and being fixedly connected to an inner panel;
    a threaded member extending through a respective outer panel and into the female member opening; and
    viscoelastic material positioned in the opening and between the female member and the threaded member.

8. Apparatus, as set forth in claim 6, wherein there are a plurality of connecting means, one portion of said connecting means being radially spaced from another portion of said connecting means.

* * * * *